US011009606B2

(12) United States Patent
Kawazoe et al.

(10) Patent No.: US 11,009,606 B2
(45) Date of Patent: May 18, 2021

(54) LASER RADAR DEVICE AND TRAVELING BODY

(71) Applicant: MITSUBISHI HEAVY INDUSTRIES, LTD., Tokyo (JP)

(72) Inventors: Kohei Kawazoe, Tokyo (JP); Takahiro Kubota, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 216 days.

(21) Appl. No.: 15/557,995

(22) PCT Filed: Nov. 19, 2015

(86) PCT No.: PCT/JP2015/082563
§ 371 (c)(1),
(2) Date: Sep. 13, 2017

(87) PCT Pub. No.: WO2016/151939
PCT Pub. Date: Sep. 29, 2016

(65) Prior Publication Data
US 2018/0038958 A1    Feb. 8, 2018

(30) Foreign Application Priority Data

Mar. 23, 2015 (JP) .............................. JP2015-060071

(51) Int. Cl.
*G01S 17/42* (2006.01)
*G01S 17/89* (2020.01)
(Continued)

(52) U.S. Cl.
CPC ............ *G01S 17/42* (2013.01); *B61L 23/041* (2013.01); *B61L 29/00* (2013.01); *G01B 11/24* (2013.01);
(Continued)

(58) Field of Classification Search
USPC .............................................. 356/3.01–5.15
See application file for complete search history.

(56) References Cited

U.S. PATENT DOCUMENTS 5,424,717 A * 6/1995 Platt ....................... G01S 7/491
340/557
2006/0152722 A1* 7/2006 Northby .................. G01P 5/20
356/337
(Continued)

FOREIGN PATENT DOCUMENTS

JP    4-198804 A    7/1992
JP    6-258040 A    9/1994
(Continued)

OTHER PUBLICATIONS

Written Opinion of the International Searching Authority and International Search Report (forms PCT/ISA/237, PCT/ISA/210 and PCT/ISA/220), dated Feb. 23, 2016, for International. Application No. PCT/JP2015/082563, with English translations.

*Primary Examiner* — Luke D Ratcliffe
(74) *Attorney, Agent, or Firm* — Birch, Stewart, Kolasch & Birch, LLP.

(57) ABSTRACT

A laser radar device includes: a light-transmission-side lens that shapes a laser beam emitted from a laser light source into a line shape extending along a horizontal direction; a scanner that projects the line-shaped laser beam while scanning the same in a vertical direction of a measurement-target area; a light-reception-side lens that receives reflected light reflected from the measurement-target area; a light reception line sensor including a plurality of light reception cells lined up along the horizontal direction; a light-reception-side optical system that gathers the reflected light received by the light-reception-side lens toward the light reception line sensor, and in which the light-gathering ratio in the vertical direction is set so as to be greater than the (Continued)

light-gathering ratio in the horizontal direction; and an information generation unit that generates three-dimensional information of the measurement-target area based on a reception signal outputted by the light reception line sensor.

5 Claims, 6 Drawing Sheets

(51) Int. Cl.
*G01B 11/24* (2006.01)
*G01C 3/06* (2006.01)
*G01S 7/481* (2006.01)
*G01S 17/931* (2020.01)
*B61L 23/04* (2006.01)
*B61L 29/00* (2006.01)
*G01S 7/4865* (2020.01)
*G08G 1/16* (2006.01)
*B61L 29/30* (2006.01)

(52) U.S. Cl.
CPC .............. *G01C 3/06* (2013.01); *G01S 7/4816* (2013.01); *G01S 7/4817* (2013.01); *G01S 7/4865* (2013.01); *G01S 17/89* (2013.01); *G01S 17/931* (2020.01); *B61L 29/30* (2013.01); *G08G 1/165* (2013.01); *G08G 1/166* (2013.01)

(56) References Cited

U.S. PATENT DOCUMENTS

| | | | |
|---|---|---|---|
| 2008/0024795 A1 | 1/2008 | Yamamoto et al. | |
| 2009/0154518 A1* | 6/2009 | Pang | G02B 27/0905 372/101 |
| 2009/0201486 A1* | 8/2009 | Cramblitt | G01S 17/931 356/4.01 |
| 2010/0141928 A1* | 6/2010 | Embry | G01N 21/4133 356/5.01 |
| 2011/0169944 A1* | 7/2011 | Zhao | G01N 21/8806 348/126 |
| 2013/0027715 A1 | 1/2013 | Imaki et al. | |
| 2013/0207970 A1* | 8/2013 | Shpunt | G06T 15/00 345/419 |
| 2014/0168634 A1* | 6/2014 | Kameyama | G01S 17/933 356/5.01 |
| 2016/0026184 A1* | 1/2016 | Stainvas Olshansky | G01S 17/936 356/4.01 |

FOREIGN PATENT DOCUMENTS

| | | |
|---|---|---|
| JP | 9-113234 A | 5/1997 |
| JP | 2005-55196 A | 3/2005 |
| JP | 2008-26243 A | 2/2008 |
| JP | 5602225 B2 | 10/2014 |

* cited by examiner

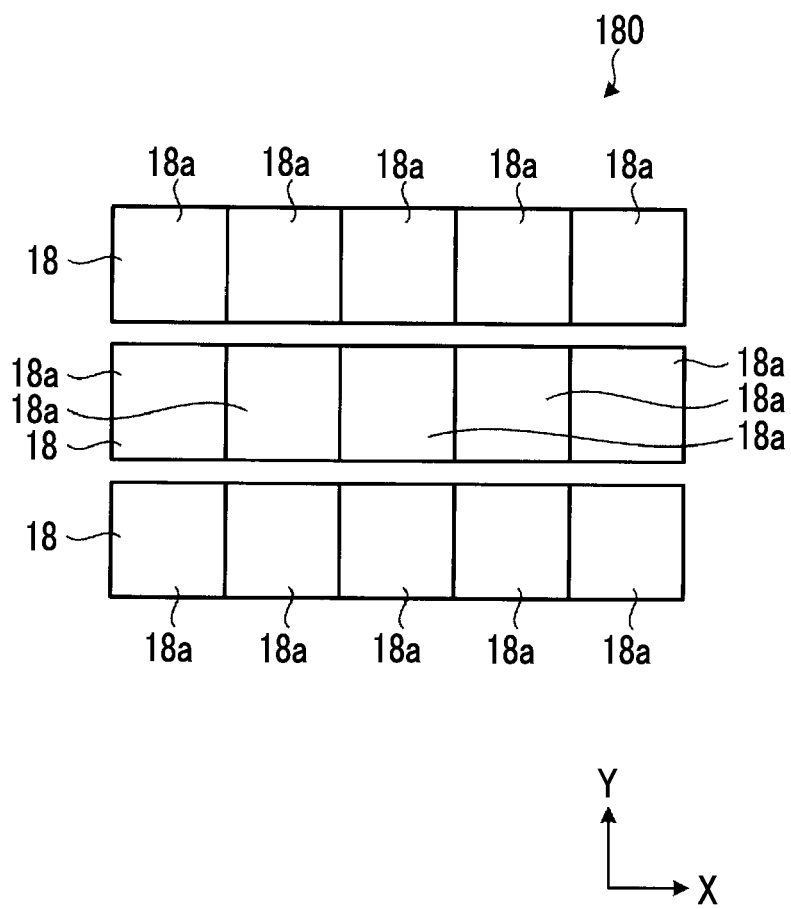

LASER RADAR DEVICE AND TRAVELING BODY

TECHNICAL FIELD

The present invention relates to a laser radar device that generates three-dimensional information of a measurement-target area by scanning a laser beam, and a traveling body.

BACKGROUND ART

Generally, laser radar devices have been known which project a laser beam while scanning the laser beam onto a measurement-target area, and generate three-dimensional information of the measurement-target area from the distribution of light receiving signals obtained by receiving reflected light from an object or the like, present in the measurement-target area, using a light receiving element. In this type of laser radar device, scanners are provided on the light transmission side of the laser beam and the light reception side of the reflected light, respectively, and a mirror angle (light-reception angle of the reflected light) on the light-reception-side scanner is adjusted at any time in accordance with a mirror angle (light-transmission angle of the laser beam) on the light-transmission-side scanner during scanning, to thereby cause the reflected light to be incident on the light receiving element. In such a configuration, since scanners are provided on both the light transmission side and the light reception side, there is a problem in that the entire laser radar device increases in its size.

In order to solve the above-mentioned problem, a laser radar device having no scanner provided on a light reception side has hitherto been proposed (see PTL 1). Such a laser radar device includes an elongated light receiving element array in which elongated light receiving elements are lined up in an array in a direction perpendicular to the elongated direction of the light receiving element, a trans-impedance amplifier array that amplifies a reception signal, and an adder circuit that adds a reception signal from each element of the trans-impedance amplifier array, to thereby realize light-reception-side scanlessness while securing a wide two-dimensional visual field.

CITATION LIST

Patent Literature

[PTL 1] Japanese Patent No. 5602225

SUMMARY OF INVENTION

Technical Problem

However, in the configuration of the related art, an elongated light receiving element array in which elongated light receiving elements are lined up in an array in a direction perpendicular to the elongated direction of the light receiving element is included, and an adder circuit that adds a reception signal received by each of the elongated light receiving elements lined up in an array is required, which leads to a problem of a device configuration and signal processing being complicated.

The present invention is contrived in view of such circumstances, and an object thereof is to provide a laser radar device and a traveling body which are capable of realizing light-reception-side scanlessness with a simple configuration.

Solution to Problem

In order to solve the above-mentioned problem and to achieve the object, according to the present invention, there is provided a laser radar device including: a laser light source; a light-transmission-side lens that shapes a laser beam emitted from the laser light source into a line shape extending along a predetermined first direction; a scanner that projects the line-shaped laser beam while scanning the laser beam in a second direction orthogonal to the first direction in a measurement-target area; a light-reception-side lens that receives reflected light reflected from the measurement-target area; a light reception line sensor, disposed on a downstream side of the light-reception-side lens, which includes a plurality of light reception cells lined up along the first direction; a light-reception-side optical system, disposed between the light-reception-side lens and the light reception line sensor, which gathers the reflected light received by the light-reception-side lens toward the light reception line sensor, and in which a light-gathering ratio in the second direction is set so as to be greater than a light-gathering ratio in the first direction; and an information generation unit that generates three-dimensional information of the measurement-target area on the basis of a reception signal which is output by the light reception line sensor.

According to such a configuration, the light reception line sensor including a plurality of light reception cells lined up along the first direction, and the light-reception-side optical system, disposed between the light-reception-side lens and the light reception line sensor, which gathers the reflected light received by the light-reception-side lens toward the light reception line sensor, and in which a light-gathering ratio in the second direction is set so as to be greater than a light-gathering ratio in the first direction are included, and thus it is possible to fit the entire measurement-target area into the sensor visual field of the light reception line sensor, and to realize light-reception-side scanlessness with a simple configuration.

In such a configuration, the light-reception-side optical system may include a relay lens disposed near or behind an imaging position of the light-reception-side lens, and a light gathering lens that gathers a substantial parallel flux of light transmitted from the relay lens toward the light reception line sensor. According to such a configuration, it is possible to gather the imaging information of the light-reception-side lens in the light reception line sensor with a simple configuration in which two types of lenses are combined.

In addition, the information generation unit may generate the three-dimensional information of the measurement-target area from position information in the first direction acquired on the basis of pixel information of the light reception cell in which the reflected light is received, distance information to the measurement-target area acquired from a light round-trip time which is taken until the laser beam is projected and then is received by the light reception line sensor, and position information in the second direction acquired on the basis of a light transmission control angle of the scanner when the laser beam is projected. According to such a configuration, the spatial position coordinate acquisition of the reception signal based on light-reception-side visual field scanning is not required, and thus it is possible to reduce a load of signal processing for generating the three-dimensional information.

In addition, the above-described laser radar device may be mounted onto a traveling body. According to such a configuration, it is possible to acquire three-dimensional information of the traveling route of the traveling body at all times, and to perform driving support of the traveling body.

Advantageous Effects of Invention

According to the present invention, the light reception line sensor including a plurality of light reception cells lined up along the first direction, and the light-reception-side optical system, disposed between the light-reception-side lens and the light reception line sensor, which gathers the reflected light received by the light-reception-side lens toward the light reception line sensor, and in which a light-gathering ratio in the second direction is set so as to be greater than a light-gathering ratio in the first direction are included, and thus it is possible to fit the entire measurement-target area into the sensor visual field of the light reception line sensor, and to realize light-reception-side scanlessness with a simple configuration.

BRIEF DESCRIPTION OF DRAWINGS

FIG. 4 is a diagram illustrating a modification example of a light reception line sensor.

DESCRIPTION OF EMBODIMENTS

Hereinafter, an embodiment according to the present invention will be described in detail with reference to the accompanying drawings. Meanwhile, it is not intended that the invention is not limited to this embodiment. In addition, components in the embodiment include components which are easily replaceable by those skilled in the art or substantially the same components. Further, components described below can be appropriately combined.

Figure 1:
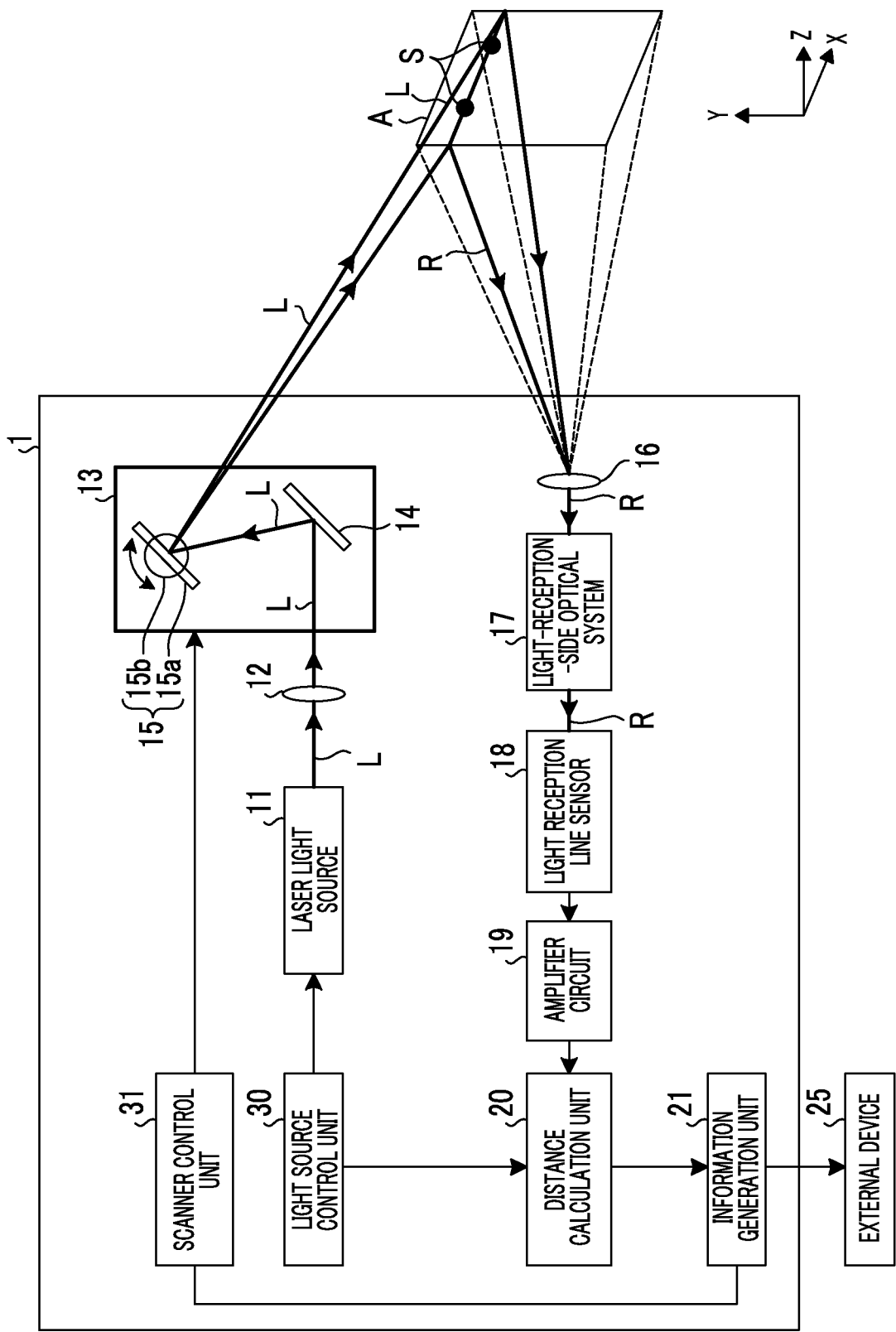
FIG. 1 is a schematic configuration diagram illustrating a laser radar device according to the present embodiment.

FIG. 1 is a schematic configuration diagram illustrating a laser radar device according to the present embodiment. As shown in FIG. 1, a laser radar device 1 projects, for example, a line-shaped laser beam L extending in a horizontal direction (first direction) X onto a predetermined measurement-target area A which is set in advance while scanning the laser beam in a vertical direction (second direction) Y orthogonal to the horizontal direction X, and receives reflected light R of the laser beam L to generate three-dimensional information of the measurement-target area A. The laser radar device is mounted in the forward traveling direction of a vehicle (traveling body) such as, for example, a train traveling on a railroad track, and generates three-dimensional information of a measurement-target area which is set in the traveling direction of the vehicle. Thereby, it is possible to discriminate whether an obstacle is present in the traveling direction of the vehicle by using the generated three-dimensional information.

As shown in FIG. 1, the laser radar device 1 includes a laser light source 11, a light-transmission-side lens 12, a scanner 13, a light-reception-side lens 16, a light-reception-side optical system 17, a light reception line sensor 18, an amplifier circuit 19, a distance calculation unit 20, an information generation unit 21, a light source control unit 30, and a scanner control unit 31. The light source control unit 30 controls an operation of the laser light source 11. The scanner control unit 31 controls an operation of the scanner 13. The light source control unit 30 has a master clock of the laser radar device 1, and sends out a pulsed light-emission synchronizing signal to the distance calculation unit 20 simultaneously with the emission of the laser beam L.

The laser radar device 1 projects the line-shaped laser beam L extending in the horizontal direction X while scanning the laser beam in the vertical direction Y of the measurement-target area A. The measurement-target area A is an area which is set at a position away by a predetermined distance from the laser radar device 1. In a case where the laser radar device 1 is mounted onto a vehicle such as, for example, a train, the measurement-target area A is updated at any time in accordance with the traveling of the vehicle.

The laser light source 11 emits the laser beam L. An example of the laser beam L used includes a laser beam having a wavelength of 200 to 2,000 nm. Particularly, in a case where the laser radar device 1 is used in an outdoor wide space, it is possible to realize stable measurement by using the laser beam having a wavelength of 800 to 2,000 nm. The laser light source 11 is constituted by, for example, a laser diode or the like, and emits the laser beam L in a pulsed manner on the basis of a light emission command of the light source control unit 30. The light-transmission-side lens 12 is constituted by a cylindrical convex lens, and shapes the laser beam L emitted from the laser light source 11 into a line shape. In the present embodiment, the axial direction of the light-transmission-side lens 12 is made to fit in with the horizontal direction X, and thus the laser beam L is shaped into a line shape extending along the horizontal direction X. The scanner 13 scans the line-shaped laser beam L in the vertical direction Y of the measurement-target area A.

The scanner 13 has a function of scanning the measurement-target area A, and includes a reflection mirror 14 that reflects the line-shaped laser beam L and a vertical scanning portion 15 that scans the line-shaped laser beam L reflected from the reflection mirror 14 in the vertical direction Y. The reflection mirror 14 reflects the laser beam L line-shaped at the light-transmission-side lens 12 to the vertical scanning portion 15. The vertical scanning portion 15 is constituted by, for example, a Galvano scanner, and includes a galvanometer mirror 15a which is a plane mirror and a driving motor 15b that trembles the specular surface of the galvanometer mirror 15a. The vertical scanning portion 15 drives the driving motor 15b to tremble the galvanometer mirror 15a, under the control of the scanner control unit 31. Thereby, the laser beam L reflected from the reflection mirror 14 has an angle in its vertical direction changed, and is scanned in the vertical direction Y of the measurement-target area A. Meanwhile, in the present embodiment, as an example of the vertical scanning portion 15, a configuration in which the Galvano scanner is used has been described, but a polygon scanner having, for example, a polygon mirror may be used without being limited to such a configuration. In addition, in a configuration in which the vertical scanning portion 15 can be disposed on the optical axis of the light-transmission-side lens 12, the reflection mirror 14 may not be provided.

The scanner control unit 31 controls an operation of the driving motor 15b on the basis of a predetermined scanning pattern. Thereby, the line-shaped laser beam L is projected onto the measurement-target area A on the basis of the scanning pattern, and these projected points (regions) become measurement points S. In this case, the scanner control unit 31 acquires a mirror angle (light transmission control angle) of the galvanometer mirror 15a corresponding to each measurement point S, and sends out this mirror angle to the information generation unit 21. In the present embodiment, the scanner 13 projects the line-shaped laser beam L onto the measurement-target area A while scanning the laser beam in a direction perpendicular to the extending direction of the line. Therefore, a three-dimensional measurement rate for the measurement-target area A is improved, and thus it is possible to measure the measurement-target area A in a short period of time.

In addition, the light-reception-side lens 16 receives reflected light R reflected from each measurement point S of the measurement-target area A. The light-reception-side optical system 17 gathers the reflected light R received in the light-reception-side lens 16 in the vertical direction Y.

Figure 2:
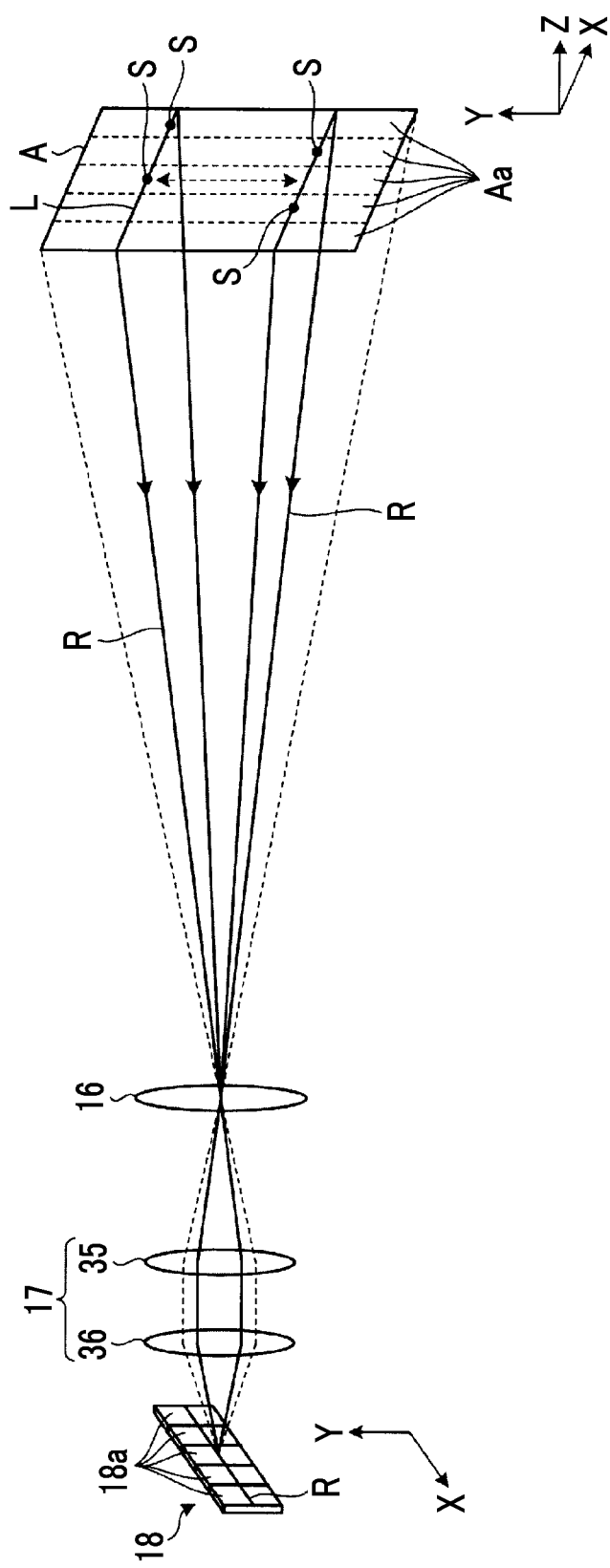
FIG. 2 is a schematic diagram illustrating a peripheral configuration including a light-reception-side optical system.
Figure 3:
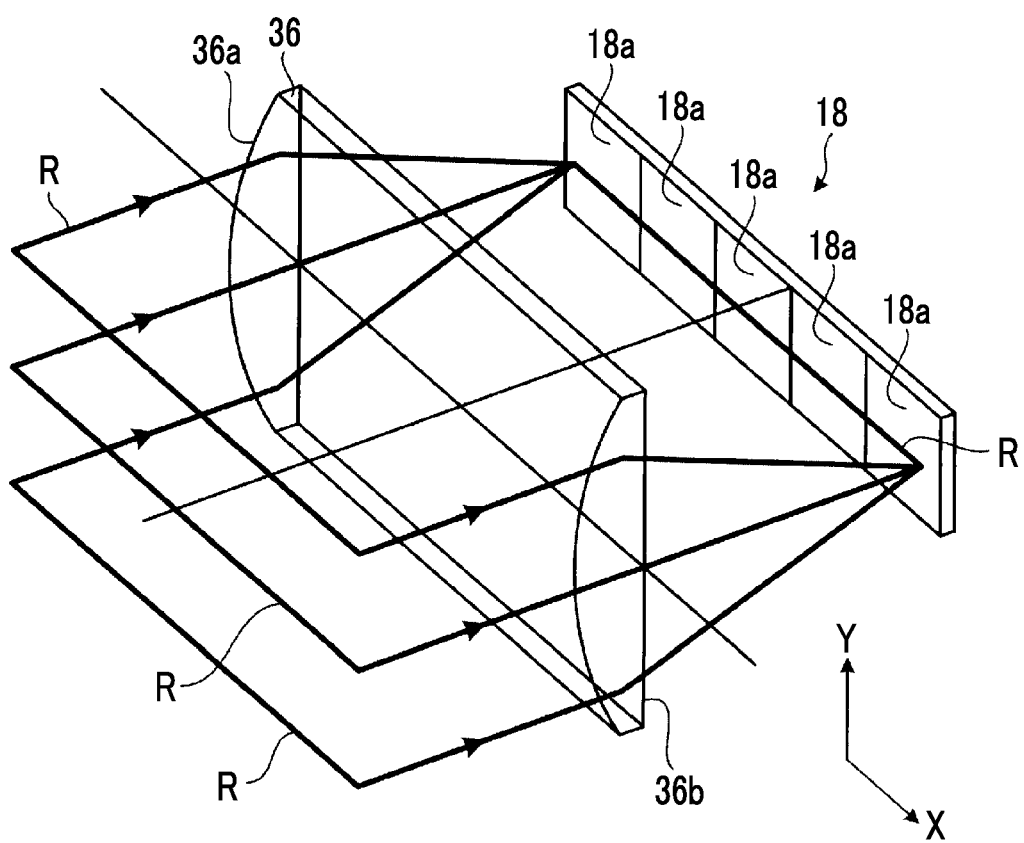
FIG. 3 is a perspective view illustrating a configuration of a light gathering lens.

FIG. 2 is a schematic diagram illustrating a peripheral configuration including a light-reception-side optical system, and FIG. 3 is a perspective view illustrating a configuration of a light gathering lens. As shown in FIG. 2, the reflected light R reflected from each measurement point S of the measurement-target area A is received in the light-reception-side lens 16. The light-reception-side lens 16 forms an image of each measurement point S at a predetermined position (imaging position) on the downstream side of the light-reception-side lens 16.

The light-reception-side optical system 17 includes a relay lens 35 disposed at the imaging position of the light-reception-side lens 16 and a light gathering lens 36 disposed on the downstream side of the relay lens 35. In FIG. 2, a configuration is used in which the relay lens 35 and the light gathering lens 36 are included one by one, but a lens unit may be, of course, used in which a plurality of respective lenses are combined. The relay lens 35 is a lens, constituted by a convex lens, which substantially collimates a subsequent flux of light in a state where imaging information of the light-reception-side lens 16 at the imaging position is held, and has a function of transmitting this imaging information, as it is, to the light gathering lens 36. In addition, in the present embodiment, the relay lens 35 is configured to be disposed at the imaging position of the light-reception-side lens 16, but may be disposed near the imaging position of the light-reception-side lens 16 or behind the imaging position, without being limited thereto.

As shown in FIG. 3, the light gathering lens 36 is constituted by a cylindrical convex lens in which the incident side of the reflected light R has a curved surface 36a, and the emission side thereof has a plane surface 36b. The light gathering lens 36 is formed so that a light-gathering ratio in the vertical direction Y becomes greater than a light-gathering ratio in the horizontal direction X. That is, the light gathering lens gathers the parallel flux of light of the reflected light R transmitted from the relay lens 35, that is, all the pieces of imaging information in the vertical direction Y toward the light reception line sensor 18. Therefore, the light-reception-side optical system 17 can gather the imaging information of the light-reception-side lens 16 in the light reception line sensor 18 with a simple configuration in which two types of lenses are combined, and thus it is possible to realize light-reception-side scanlessness.

The light reception line sensor 18 is configured to include a plurality of (five in the present embodiment) light reception cells 18a lined up along the horizontal direction X. Each of the light reception cells 18a is formed by a photoelectric conversion element (for example, photodiode) that receives the reflected light R to converts the received light into a current, and is formed by a single element having a single pixel. Therefore, it is possible to respond to the laser beam L having a short pulse.

In such a configuration, the measurement-target area A is divided into five division areas Aa in accordance with the number (five) of light reception cells 18a. The reflected light R from the measurement-target area A is spatially resolved into five parts corresponding to the division areas Aa, and is received in a light reception cell 18a corresponding to a division area Aa. In this case, the reflected light R from the division areas Aa is gathered by the light gathering lens 36 in the vertical direction Y, and is received in a corresponding light reception cell 18a. Therefore, the parallel flux of light of the reflected light R from the measurement-target area A, that is, all the pieces of imaging information are gathered in the light reception line sensor 18.

The light reception line sensor 18 receives the reflected light R gathered in the light-reception-side optical system 17, and outputs a reception signal based on the laser beam L included in the received reflected light R. The amplifier circuit 19 amplifies the reception signal which is output by the light reception line sensor 18 as a voltage signal. Since the reception signal which is output by the light reception line sensor 18 is a weak current signal, the amplifier circuit 19 converts the current signal into a voltage signal to output the converted signal to the distance calculation unit 20. In the present embodiment, a light receiving unit is constituted inclusive of the light reception line sensor 18 and the amplifier circuit 19.

The distance calculation unit 20 calculates distance information of the measurement point S in the measurement-target area A, on the basis of the reception signal amplified by the amplifier circuit 19. The distance calculation unit 20 receives the pulsed light-emission synchronizing signal sent out from the light source control unit 30 and the reception signal sent out from the amplifier circuit 19, calculates a distance to the measurement point S in the measurement-target area A onto which the laser beam L is projected, and sends out the distance information to the information generation unit 21. Specifically, the distance calculation unit 20 measures a time which will be taken until the laser beam L is emitted and then the reflected light R is received on the basis of the light-emission synchronizing signal and the reception signal, and calculates a distance to the measurement point S at which the laser beam L is reflected on the basis of this measurement time. In addition, the distance calculation unit 20 may send out light reception intensity included in the reception signal, together with the distance information, to the information generation unit 21 in association with the distance information.

In addition, the distance calculation unit 20 calculates position information in the horizontal direction X of the measurement point S in the measurement-target area A on the basis of the reception signal amplified by the amplifier circuit 19. Specifically, the distance calculation unit 20 acquires pixel information (number) of a light reception cell 18a in which the reflected light R is received, calculates position information in the horizontal direction X of the measurement point S from this pixel information, and sends out this position information to the information generation unit 21.

The information generation unit 21 acquires a mirror angle (light transmission control angle) of the galvanometer mirror 15a relating to the measurement point S sent out from the scanner control unit 31, and calculates position information in the vertical direction Y of the measurement point S on the basis of this mirror angle. The information generation unit 21 acquires coordinate information at the measurement point S on the basis of the distance information of the measurement point S and the position information in the horizontal direction X which are received from the distance calculation unit 20, and the position information in the vertical direction Y of the measurement point S, and generates three-dimensional information of the measurement-target area A from the distribution of the coordinate information of a plurality of measurement points S present in the measurement-target area A. In such a configuration, since the spatial position coordinate acquisition of the reception signal based on light-reception-side visual field scanning is not required, it is possible to reduce a load of signal processing for generating the three-dimensional information. The three-dimensional information of the measurement-target area A generated by the information generation unit 21 is transmitted to an external device 25 (such as, for example, a computer of a vehicle) in a wired or wireless manner, and is used in the external device 25.

In the laser radar device 1 of the present embodiment, the light gathering lens 36 gathers all the pieces of imaging information of the light-reception-side lens 16, transmitted from the relay lens 35, in the light reception line sensor 18 in which the respective light reception cells 18a are disposed side by side. Therefore, the reflected light R from any of the measurement points S in the measurement-target area A is gathered in the light reception line sensor 18, and thus the light reception line sensor 18 can fit the entirety of the divided regions Aa in the measurement-target area A, at all times, into the visual field of each light reception cell of the sensor.

For example, an elongated light receiving element array in which elongated light receiving elements disclosed in Japanese Patent No. 5602225 are lined up in an array in a direction perpendicular to the elongated direction of the light receiving element, and an adder circuit that adds a reception signal of each elongated light receiving element are included, to thereby realize light-reception-side scanlessness while securing a wide two-dimensional visual field. However, in the related art, the lining up of the elongated light receiving elements in an array in a direction perpendicular to the elongated direction of the light receiving element causes an increase in the size of the elongated light receiving element array, and thus there may be a concern of being contrary to the purpose of a reduction in the size of the laser radar device. In addition, the adder circuit that adds a reception signal received by each of the elongated light receiving elements lined up in an array is required, and thus there may be a concern of a device configuration being complicated. On the other hand, the laser radar device 1 is provided with the light-reception-side optical system 17 as described above, and thus the reflected light R of the measurement-target area A is gathered in the light reception line sensor 18 in the vertical direction Y. Thereby, the reflected light R from any of the measurement points S in the measurement-target area A is gathered in the light reception line sensor 18. Therefore, in the light reception line sensor 18, it is possible to fit the entire measurement-target area A, at all times, into the visual field of the sensor, to thus handle the reflected light from the measurement-target area A as a single piece of information, and to realize a reduction in size.

Here, a configuration is assumed in which the light reception line sensor 18 having the light reception cells 18a constituted by a single pixel is disposed at the imaging position of the light-reception-side lens 16. However, in such a configuration, since the area of the light reception cell 18a of the light reception line sensor 18 is extremely smaller than the area of the imaging information at the imaging position of the light-reception-side lens 16, only a portion of the measurement-target area A in the vertical direction Y can be fitted into the visual field of the sensor. In addition, in order to secure the visual field of the sensor in the entire vertical direction Y of the measurement-target area A, the magnitude (height) of each light reception cell 18a in the vertical direction Y is required to be set to a magnitude equal to or greater than that of the imaging information at the imaging position of the light-reception-side lens 16. However, an increase in the sensor pixel size of the light reception cell 18a causes a problem in that responsiveness as a light reception cell (photodiode) lowers.

On the other hand, in the present embodiment, the light-reception-side optical system 17 includes the relay lens 35 disposed at the imaging position of the light-reception-side lens 16 and the light gathering lens 36 disposed on the downstream side of the relay lens 35, and the light gathering lens 36 gathers all the pieces of imaging information of the light-reception-side lens 16, transmitted from the relay lens 35, in the light reception line sensor 18 in which the light reception cells 18a are lined up. Therefore, it is possible to cover information of the entire visual field included in the light-reception-side lens 16, regardless of the pixel shape of the light reception cell 18a, without lowering responsiveness. Therefore, the light reception cell 18a can be constituted by a line sensor in which rectangular, square or circular pixels are lined up, thereby allowing the choice of the sensor to be increased.

Next, a modification example of the light receiving element will be described. FIG. 4 is a diagram illustrating a modification example of the light reception line sensor. In the above-described embodiment, a configuration is used in which one light reception line sensor 18 is provided which has the light reception cells 18a disposed side by side in the horizontal direction X. However, as shown in FIG. 4, it is also possible to form a line sensor array 180 in which a plurality of (for example, three) light reception line sensors 18 are lined up in an array in the vertical direction Y. In such a configuration, the remaining two light reception line sensors 18 lined up in the vertical direction Y are preliminarily disposed, and even in a case of the deviation of a position at which light is gathered in the light reception line sensor 18 by the light-reception-side lens 16—the relay lens 35—the light gathering lens 36 during the operation of the laser radar device 1, or an increase in light-gathering size due to deviation from an optimum point, it is possible to use a light reception line sensor 18 of the line sensor array 180 in which the reflected light is gathered. According to this, it is possible to reliably receive the reflected light in the light receiving element, and to secure the quality of measurement.

Figure 5A:
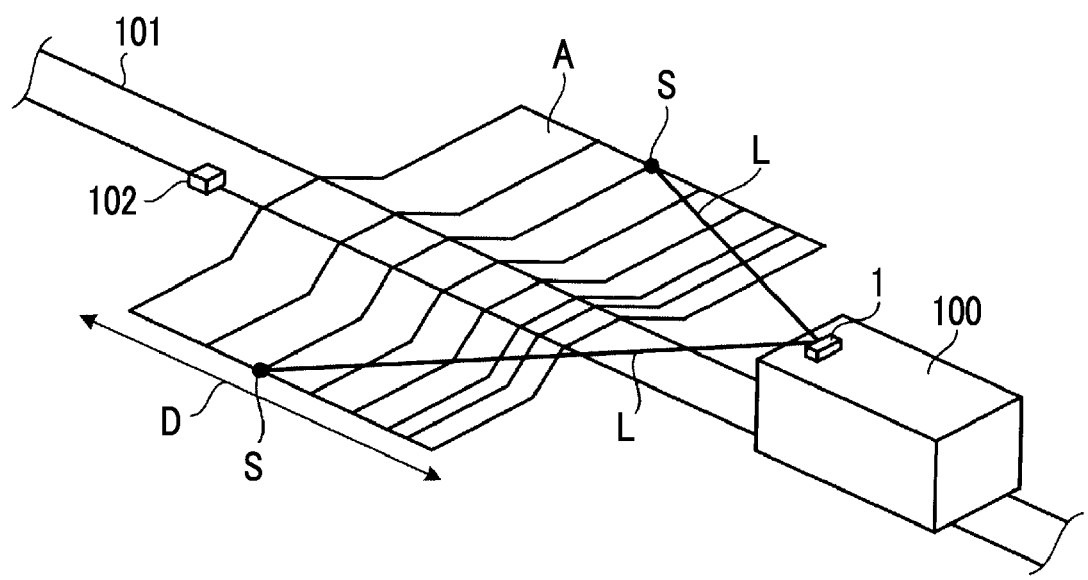
FIG. 5A is a perspective view illustrating a configuration in which the laser radar device is mounted onto a train traveling on a railroad track.
Figure 5B:
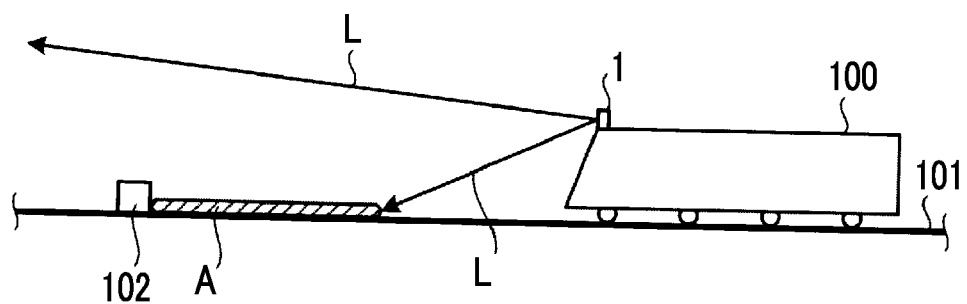
FIG. 5B is a side-view diagram illustrating a configuration in which the laser radar device is mounted onto the train traveling on the railroad track.

Next, an application example of the laser radar device 1 of the present embodiment will be described. FIG. 5A is a perspective view illustrating a configuration in which the laser radar device is mounted onto a train traveling on a railroad track, and FIG. 5B is a side-view diagram illustrating a configuration in which the laser radar device is mounted onto the train traveling on the railroad track. In this application example, the laser radar device 1 is mounted onto a train (traveling body) 100. The train 100 travels on a railroad track 101, and may be configured to be driven by a driver's operation, or configured to be automatically driven by a computer.

The laser radar device 1 is provided at the upper front of the train 100, and is configured to monitor the measurement-target area A which is set in the forward traveling direction of the train 100. Since the laser radar device 1 is configured not be provided with a light-reception-side scanner as described above, a reduction in the size of the laser radar device 1 is realized. Therefore, in the train 100 having the laser radar device 1 mounted thereon, a decrease in a free space within the train 100 due to the placement layout of the laser radar device 1, or the influence of a protrusion portion or the like outside the train 100 can be kept to a minimum.

Specifically, the measurement-target area A is set on a traveling road surface in a forward traveling direction including the railroad track 101 over a predetermined distance D (for example, 300 to 500 m) from the train 100, and the measurement-target area A is updated at any time in accordance with the traveling of the train 100. The laser radar device 1 projects the laser beam L toward the measurement-target area A while scanning the laser beam, and generates three-dimensional information of the measurement-target area A on the basis of distance information and position information of each measurement point S.

The train 100 includes a computer that acquires the three-dimensional information of the measurement-target area A output from the laser radar device 1, as the external device 25 (FIG. 1), and a display that displays the shape of the measurement-target area A drawn by this computer on the basis of the three-dimensional information, which are not shown in the drawing. The computer and the display are disposed in a driver's cabin of the train 100.

In such a configuration, the three-dimensional information generated by the laser radar device 1 is output to the computer of the train 100 at any time, and is displayed on the display through this computer. Therefore, for example, even in a case where an obstacle 102 is present on the railroad track 101, the shape of the measurement-target area A including the obstacle 102 is displayed on the display, driving support for a driver can be realized. In addition, even in a case where not only the shape is displayed on the display, but also the change of the shape in a traveling direction in the measurement-target area A exceeds a predetermined threshold value, an attention warning may be issued on the assumption that the obstacle 102 is more likely to be present.

In addition, in a configuration in which the train 100 is automatically driven by the computer, in a case where the obstacle 102 is present on the railroad track 101 on the basis of the three-dimensional information generated by the laser radar device 1, it is possible to realize safe automatic driving by stopping the train 100.

Figure 6:
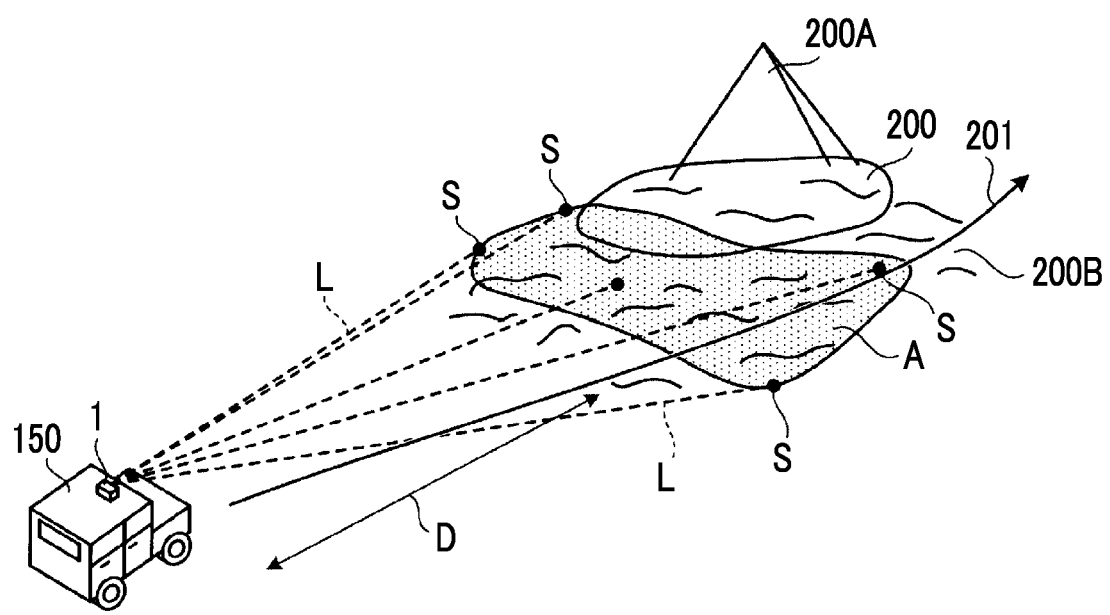
FIG. 6 is a perspective view illustrating a configuration in which the laser radar device is mounted onto a vehicle.

FIG. 6 is a perspective view illustrating a configuration in which the laser radar device is mounted onto a vehicle. In such an application example, the laser radar device 1 is mounted onto a vehicle (traveling body) 150. The vehicle 150 freely travels on a road surface, and may be configured to be driven by a driver's operation, or configured to be automatically driven by the computer.

The laser radar device 1 is provided at the upper front of the vehicle 150, and is configured to monitor the measurement-target area A which is set on a landform 200 in the forward traveling direction of the vehicle 150. Since the laser radar device 1 is configured not be provided with a light-reception-side scanner as described above, a reduction in the size of the laser radar device 1 is realized. Therefore, in the vehicle 150 having the laser radar device 1 mounted thereon, a decrease in a free space within the vehicle 150 due to the placement layout of the laser radar device 1, or the influence of a protrusion portion or the like outside the vehicle 150 can be kept to a minimum.

Specifically, the measurement-target area A is set on the surface of the landform 200 in a forward traveling direction over a predetermined distance D (for example, 100 m) from the vehicle 150, and the measurement-target area A is updated at any time in accordance with the traveling of the vehicle 150. The laser radar device 1 projects the laser beam L toward the measurement-target area A while scanning the laser beam, and generates three-dimensional information of the measurement-target area A (landform 200) on the basis of distance information and position information of each measurement point S. In FIG. 6, the landform 200 is described as including an apex portion 200A having large undulations and a flattened portion 200B having small undulations.

The vehicle 150 includes a navigation device, not shown in the drawing, which performs route guidance of the vehicle 150, as the external device 25 (FIG. 1). This navigation device includes a control unit that controls the entire navigation device and a display that displays a route (map information), and the three-dimensional information of the measurement-target area A is output to the control unit. The navigation device sets a route 201 through the flattened portion 200B having small undulations while avoiding the apex portion 200A having large undulations, on the basis of the three-dimensional information of the measurement-target area A. According to such a configuration, even in a case where the vehicle travels along the landform 200 having severe undulations, it is possible to travel along the route 201 including, preferably, the flattened portion 200B, and to realize driving support for a driver.

In addition, in a configuration in which the vehicle 150 is automatically driven by the computer, it is possible to realize safe automatic driving by traveling along the route 201 including, preferably, the flattened portion 200B, on the basis of the three-dimensional information generated by the laser radar device 1.

In the above-described application example, a configuration has been described in which the laser radar device 1 is mounted onto the traveling body of the train 100 or the vehicle 150, but there is no limitation thereto in a case of a self-propelled traveling body. In addition, in the above-described application example, the laser radar device 1 is mounted onto the traveling body, but a configuration may be used in which the laser radar device is disposed on, for example, a strut disposed upright at the side of a crossover point, a railroad crossing or the like having the measurement-target area A set therein so as to look down at the measurement-target area A, the line-shaped laser beam L is projected while scanning the laser beam in the vertical direction Y, and the reflected light R of objects (for example, moving objects such as a pedestrian, a bicycle, a two-wheeled automobile, or an automobile, stationary objects such as a building, a guardrail, or a tree, and the like) within the measurement-target area A is received, to thereby generate three-dimensional information of these objects.

As described above, the laser radar device 1 according to the present embodiment includes the laser light source 11, the light-transmission-side lens 12 that shapes the laser beam L emitted from the laser light source 11 into a line shape extending along the horizontal direction X, the scanner 13 that projects the line-shaped laser beam L while scanning the laser beam in the vertical direction Y orthogonal to the horizontal direction X in the measurement-target area A, the light-reception-side lens 16 that receives the reflected light R reflected from the measurement-target area A, the light reception line sensor 18, disposed on the downstream side of the light-reception-side lens 16, which includes a plurality of light reception cells 18a lined up along the horizontal direction X, the light-reception-side optical system 17, disposed between the light-reception-side lens 16 and the light reception line sensor 18, which gathers the reflected light R received by the light-reception-side lens 16 toward the light reception line sensor 18, and in which a light-gathering ratio in the vertical direction Y is set so as to be greater than a light-gathering ratio in the horizontal direction X, and the information generation unit 21 that generates three-dimensional information of the measurement-target area A on the basis of a reception signal which is output by the light reception line sensor 18. Therefore, it is possible to fit the entire measurement-target area A into the sensor visual field of the light reception line sensor 18, and to realize light-reception-side scanlessness with a simple configuration.

In addition, according to the present embodiment, the light-reception-side optical system 17 includes the relay lens 35, disposed at the imaging position of the light-reception-side lens 16, which transmits imaging information at the imaging position in a state where the imaging information is held, and the light gathering lens that gathers the parallel flux of light transmitted from the relay lens 35 toward the light reception line sensor 18. Therefore, it is possible to gather the imaging information of the light-reception-side lens 16 in the light reception line sensor 18 with a simple configuration in which two types of lenses are combined.

In addition, according to the present embodiment, the information generation unit 21 generates three-dimensional information of the measurement-target area A from position information in the horizontal direction X of the measurement point S in the measurement-target area A acquired on the basis of pixel information of a light reception cell 18a in which the reflected light R is received, distance information to the measurement point S acquired from a light round-trip time which will be taken until the laser beam L is projected and then is received by the light reception line sensor 18, and position information in the vertical direction Y of the measurement point S acquired on the basis of a mirror angle of the scanner 13 when the laser beam L is projected. Therefore, the spatial position coordinate acquisition of the reception signal based on light-reception-side visual field scanning is not required, and thus it is possible to reduce a load of signal processing for generating the three-dimensional information.

In addition, since the above-described laser radar device 1 is mounted onto the train 100 or the vehicle 150, it is possible to acquire the three-dimensional information of the traveling route of the train 100 or the vehicle 150 at all times, and to perform the driving support of the train 100 or the vehicle 150.

REFERENCE SIGNS LIST

1: laser radar device
11: laser light source
12: light-transmission-side lens
13: scanner
15: vertical scanning portion
16: light-reception-side lens
17: light-reception-side optical system
18: light reception line sensor
18a: light reception cell
21: information generation unit
30: light source control unit
31: scanner control unit
35: relay lens
36: light gathering lens
36a: curved surface
36b: plane surface
100: train (traveling body)
150: vehicle (traveling body)
A: measurement-target area
Aa: division area
L: laser beam
R: reflected light
S: measurement point
X: horizontal direction (first direction)
Y: vertical direction (second direction)

The invention claimed is:

1. A laser radar device comprising:
a laser light source;
a light-transmission-side lens that shapes a laser beam emitted from the laser light source into a line shape extending along a predetermined first direction;
a scanner that projects the line-shaped laser beam while scanning the laser beam in a second direction orthogonal to the first direction in a measurement-target area;
a light-reception-side lens that receives reflected light reflected from the measurement-target area;
a light reception line sensor, disposed on a downstream side of the light-reception-side lens, which includes a plurality of light reception cells lined up along the first direction;
a light-reception-side optical system, disposed between the light-reception-side lens and the light reception line sensor, which gathers the reflected light received by the light-reception-side lens toward the light reception line sensor; and
an information generation unit that generates three-dimensional information of the measurement-target area on the basis of a reception signal which is output by the light reception line sensor,
wherein the light-reception-side optical system includes a relay lens, disposed near or behind an imaging position of the light-reception-side lens, which collimates and transmits imaging information of the light-reception-side lens toward the light reception line sensor as received from the light-reception-side lens, and a light gathering lens, disposed between the relay lens and the light reception line sensor, that gathers a flux of light transmitted from the relay lens in the second direction toward the light reception line sensor.

2. The laser radar device according to claim 1, wherein the information generation unit generates the three-dimensional information of the measurement-target area from position information in the first direction acquired on the basis of pixel information of the light reception cell in which the reflected light is received, distance information to the measurement-target area acquired from a light round-trip time which is taken until the laser beam is projected and then is received by the light reception line sensor, and position information in the second direction acquired on the basis of a light transmission control angle of the scanner when the laser beam is projected.

3. A traveling body comprising the laser radar device according to claim 1.

4. A traveling body comprising the laser radar device according to claim 2.

5. The laser radar device according to claim 1, wherein a light-gathering ratio in the second direction is set so as to be greater than a light-gathering ratio in the first direction.

* * * * *